US012804537B2

(12) United States Patent
Wagner

(10) Patent No.: US 12,804,537 B2
(45) Date of Patent: Nov. 17, 2026

(54) SYSTEMS AND METHODS FOR TRACKING AN ASSET CARRIED VIA A TRANSPORTATION MEDIUM

(71) Applicant: LandAirSea Holdings, LLC, Boca Raton, FL (US)

(72) Inventor: Robert M. Wagner, Dorado, PR (US)

(73) Assignee: LandAirSea Holdings, LLC, Boca Raton, FL (US)

( * ) Notice: Subject to any disclaimer, the term of this patent is extended or adjusted under 35 U.S.C. 154(b) by 214 days.

(21) Appl. No.: 18/783,737

(22) Filed: Jul. 25, 2024

(65) Prior Publication Data

US 2026/0032580 A1 Jan. 29, 2026

(51) Int. Cl.
*H04W 52/02* (2009.01)
*G06Q 10/0833* (2023.01)
*H04W 4/021* (2018.01)
*H04W 4/029* (2018.01)

(52) U.S. Cl.
CPC ........ *H04W 52/02* (2013.01); *G06Q 10/0833* (2013.01); *H04W 4/021* (2013.01); *H04W 4/029* (2018.02)

(58) Field of Classification Search
None
See application file for complete search history.

(56) References Cited

U.S. PATENT DOCUMENTS 10,957,204 B1 3/2021 Kumar et al.
11,770,677 B1 * 9/2023 Lesesky .................. H04W 4/42 455/456.1
12,069,542 B1 * 8/2024 Atkinson .............. H04W 4/029
2012/0252488 A1 10/2012 Hartmann et al.
2013/0147617 A1 * 6/2013 Boling ............... G06Q 10/0833 340/431
2019/0253843 A1 * 8/2019 Lanes ................... H04W 4/029
2020/0382925 A1 * 12/2020 Doig ........................ G01S 19/51
2021/0312726 A1 10/2021 Schäfer et al.
2022/0276061 A1 * 9/2022 Viitala ............... G06Q 10/0833
2024/0292369 A1 * 8/2024 Jantzi .................. H04W 64/003
2024/0321122 A1 * 9/2024 Manzalini ................ G08G 5/26
2024/0414653 A1 * 12/2024 Jantzi .................... G01S 5/0027
2025/0164627 A1 * 5/2025 Jantzi ...................... G01S 13/06
2025/0208279 A1 * 6/2025 Fuleshwar Prasad .. G01S 11/02
2026/0032405 A1 * 1/2026 Jantzi .................... H04W 4/023

FOREIGN PATENT DOCUMENTS

WO 2011/070534 A2 6/2011

* cited by examiner

*Primary Examiner* — Pablo N Tran
(74) *Attorney, Agent, or Firm* — BakerHostetler

(57) ABSTRACT

Systems and methods are provided for tracking an asset carried via a transportation medium. One such system includes a tracking device and a server. The tracking device is configured to be attached to the asset. The server is configured to receive, from the tracking device, positional information of the tracking device during at least a first operational mode and receive, from a secondary tracking system associated with the transportation medium, positional information of the transportation medium during at least a second operational mode. The server is further configured to determine whether the tracking device is being carried via the transportation medium and to automatically switch between the first operational mode and the second operational mode in response to determining whether the tracking device is being carried via the transportation medium.

20 Claims, 5 Drawing Sheets

SYSTEMS AND METHODS FOR TRACKING AN ASSET CARRIED VIA A TRANSPORTATION MEDIUM

FIELD

This disclosure is directed to systems and methods for tracking an asset carried via a transportation medium, and more particularly to systems and methods for intelligently switching between multiple operational modes in response to determining whether the tracking device is being carried via the transportation medium.

BACKGROUND

In certain environments such as trains, sea vessels, and aircraft, conventional connectivity or positioning systems (e.g., GPS, cellular, Bluetooth, WiFi) are difficult or impractical to employ due to poor or non-existent signal connectivity. For example, when a shipping container equipped with a conventional tracking device is buried in a shipyard amongst other shipping containers or onboard a sea vessel or aircraft, it can be difficult—and often impossible—to establish signal connectivity to the tracking device in order to track the shipping container.

As such, it would be desirable to provide systems and methods for tracking an asset carried via a transportation medium that are capable of selectively and intelligently switching between various operational modes to leverage various different available connectivity or tracking/positioning systems based upon specific determinations, such as whether the tracking device is being carried via the transportation medium, whether the tracking device is within a motion geofence associated with the transport medium, whether the tracking device is in signal communication with a server, or the like, including combinations thereof.

BRIEF SUMMARY

In a first aspect, a system for tracking an asset carried via a transportation medium is provided. The system includes a tracking device. The tracking device is configured to be attached to the asset. The system further includes a server. The server is configured to receive positional information of the tracking device. The server is configured to receive the positional information of the tracking device from the tracking device. The server is configured to receive the positional information of the tracking device from the tracking device during at least a first operational mode. The server is further configured to receive positional information of the transportation medium. The server is configured to receive the positional information of the transportation medium from a secondary tracking system. The secondary tracking system is associated with the transportation medium. The server is configured to receive the positional information of the transportation medium from the secondary tracking system during at least a second operational mode. The server is further configured to determine whether the tracking device is being carried via the transportation medium. The server is further configured to automatically switch between the first operational mode and the second operational mode. The server is configured to automatically switch between the first operational mode and the second operational mode in response to determining whether the tracking device is being carried via the transportation medium.

In certain aspects, the server may be further configured to determine that the tracking device is not being carried via the transportation medium and operate in the first operational mode in response to determining that the tracking device is not being carried via the transportation medium.

In certain aspects, the server may be further configured to determine that the tracking device is being carried via the transportation medium and operate in the second operational mode in response to determining that the tracking device is being carried via the transportation medium.

In certain aspects, the server may be further configured to determine whether the tracking device is within a motion geofence associated with the transport medium and determine, based upon whether the tracking device is within the motion geofence associated with the transport medium, whether the tracking device is being carried via the transportation medium. In some aspects, the server may be further configured to determine that the tracking device is not within the motion geofence associated with the transport medium and operate in the first operational mode in response to determining that the tracking device is not within the motion geofence associated with the transport medium. In some aspects, the server may be further configured to determine that the tracking device is within the motion geofence associated with the transport medium and operate in the second operational mode in response to determining that the tracking device is within the motion geofence associated with the transport medium.

In certain aspects, the server may be further configured to determine whether the tracking device is in signal communication with the server. In some aspects, the server may be further configured to determine that the tracking device is not in signal communication with the server and operate in the second operational mode in response to determining that the tracking device is not in signal communication with the server. In some aspects, the server may be further configured to determine that the tracking device is in signal communication with the server and operate in the first operational mode in response to determining that the tracking device is in signal communication with the server.

In certain aspects, the asset may be a shipping container. In some aspects, the transportation medium may be a sea vessel and the secondary tracking system may be an automatic identification system (AIS). In some aspects, the transportation medium may be an aircraft and the secondary tracking system may be an automatic dependent surveillance-broadcast (ADS-B) system.

In certain aspects, during at least a portion of the second operational mode, the tracking device may be configured to be in a standby state in which the tracking device does not provide the positional information of the tracking device to the server.

In a second aspect, a method for tracking an asset carried via a transportation medium is provided. The method includes receiving positional information of a tracking device. The positional information of the tracking device is received from the tracking device. The tracking device is configured to be attached to the asset. The positional information of the tracking device is received from the tracking device during at least a first operational mode. The method further includes receiving positional information of the transportation medium. The positional information of the transportation medium is received from a secondary tracking system. The secondary tracking system is associated with the transportation medium. The positional information of the transportation medium is received from the secondary tracking system during at least a second operational mode. The method further includes determining whether the tracking device is being carried via the transportation medium. The method further includes automatically switching between the first operational mode and the second operational mode. Automatically switching between the first operational mode and the second operational mode is performed in response to determining whether the tracking device is being carried via the transportation medium.

In certain aspects, the method further includes determining that the tracking device is not being carried via the transportation medium and operating in the first operational mode in response to determining that the tracking device is not being carried via the transportation medium.

In certain aspects, the method further includes determining that the tracking device is being carried via the transportation medium and operating in the second operational mode in response to determining that the tracking device is being carried via the transportation medium.

In certain aspects, the method further includes determining whether the tracking device is within a motion geofence associated with the transport medium and determining, based upon whether the tracking device is within the motion geofence associated with the transport medium, whether the tracking device is being carried via the transportation medium. In some aspects, the method further includes determining that the tracking device is not within a motion geofence associated with the transport medium and operating in the first operational mode in response to determining that the tracking device is not within the motion geofence associated with the transport medium. In some aspects, the method further includes determining that the tracking device is within the motion geofence associated with the transport medium and operating in the second operational mode in response to determining that the tracking device is within the motion geofence associated with the transport medium.

In a third aspect, a system for tracking an asset carried via a transportation medium is provided. The system includes a non-transitory computer-readable medium storing instructions executable by a processor to receive, from a tracking device configured to be attached to the asset, positional information of the tracking device during at least a first operational mode; receive, from a secondary tracking system associated with the transportation medium, positional information of the transportation medium during at least a second operational mode; determine whether the tracking device is being carried via the transportation medium; and automatically switch between the first operational mode and the second operational mode in response to determining whether the tracking device is being carried via the transportation medium.

Additional embodiments and features are set forth in part in the description that follows, and will become apparent to those skilled in the art upon examination of the specification or may be learned by the practice of the disclosed subject matter. A further understanding of the nature and advantages of the disclosure may be realized by reference to the remaining portions of the specification and the drawings, which forms a part of this disclosure.

BRIEF DESCRIPTION OF THE DRAWINGS

The description will be more fully understood with reference to the following figures and data graphs, which are presented as various embodiments of the disclosure and should not be construed as a complete recitation of the scope of the disclosure, wherein.

DETAILED DESCRIPTION

Figure 1A:
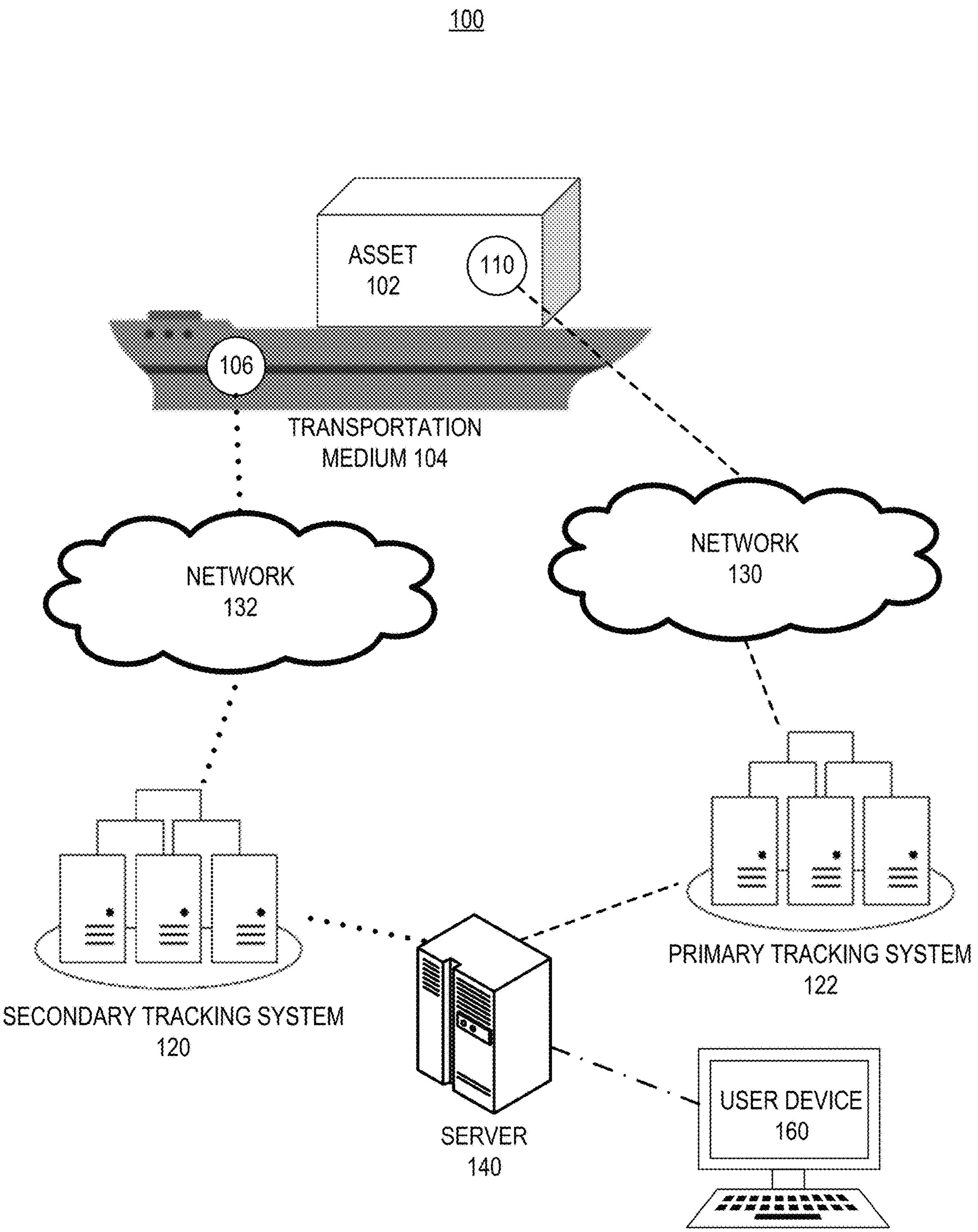
FIG. 1A shows a system for tracking an asset carried via a transportation medium according to an illustrative embodiment of the present disclosure.

The disclosure may be understood by reference to the following detailed description, taken in conjunction with the drawings as described below. It is noted that, for purposes of illustrative clarity, certain elements in various drawings may not be drawn to scale.

As used herein, the term "motion geofence" refers to a predetermined virtual positional boundary that travels with an associated mobile medium (e.g., train, sea vessel, aircraft).

As will be appreciated by those skilled in the art, the systems and methods described herein for tracking an asset carried via a transportation medium can be used in a wide variety of applications and with a wide variety of assets. By way of non-limiting example, the systems and methods described herein can be used to track intermodal shipping containers carried via a sea vessel or aircraft. By way of further non-limiting example, the systems and methods described herein can be used to track other movable assets (e.g., generators, firearms) carried by any transportation medium. Further yet, the systems and methods described herein can be used with a wide variety of tracking devices, including off-the-shelf tracking devices used to provide positional information as well as a variety of other information (e.g., temperature, moisture, acceleration, direction). By way of non-limiting example, the tracking devices may share many common design aspects with a 54 GPS tracker or other similar tracking device commercially available from LandAirSea, Inc. of Woodstock, Illinois. For example, with reference to the drawings, the tracking devices are illustrated by way of non-limiting example as puck-style tracking devices, although other examples are not necessarily so limited. In particular, those skilled in the art will recognize that the present disclosure, including the systems and methods described herein, can be implemented with any suitable tracking device and in other situations or environments.

In certain environments, such as aboard a sea vessel or aircraft, conventional connectivity or positioning systems (e.g., GPS, cellular, Bluetooth, WiFi) are difficult or impractical to employ due to poor or non-existent signal connectivity. For example, when a shipping container equipped with a conventional tracking device is buried in a shipyard amongst other shipping containers or onboard a sea vessel or aircraft, it can be difficult—and often impossible—to establish signal connectivity to the tracking device in order to track the shipping container. The systems and methods described herein overcome the foregoing and provide systems and methods for tracking an asset carried via a transportation medium that are capable of selectively and intelligently switching between various operational modes to leverage various different available connectivity or tracking/ positioning systems based upon specific determinations, such as whether the tracking device is being carried via the transportation medium, whether the tracking device is within a motion geofence associated with the transport medium, whether the tracking device is in signal communication with a server, or the like, including combinations thereof.

FIG. 1A illustrates an example system 100 for tracking an asset carried via a transportation medium according to one embodiment. As illustrated, system 100 may include a primary tracking device 110 (shortly, "tracking device 110") and a server 140.

As illustrated, tracking device 110 is generally configured to be attached to or otherwise associated with an asset 102. As will be appreciated by those skilled in the art, system 100 can include any number of tracking devices 110, and each such tracking device 110 may be attached to or otherwise associated with a respective asset 102. Tracking device 110 may be attached to or otherwise associated with asset 102 by any suitable means. By way of non-limiting example, as described herein, at least a portion of tracking device 110 may include a ferromagnetic material configured to magnetically attach tracking device 110 to a metal surface or portion of asset 102, thereby obviating the need for any particular fixtures on asset 102 and providing ease of installation and removal of tracking device 110. In some examples, tracking device 110 may include means for determining whether tracking device 110 has been attached (e.g., magnetically) to an asset 102 (e.g., a shipping container), such as a magnetic or metal detector, optical sensor, mechanical switch or button, or the like, including combinations thereof. Server 140 may generally be any number of computing devices configured to effectuate the functionality described herein.

In embodiments, tracking device 110 may be in signal communication with (e.g., communicatively coupled with) server 140, such as for sending and/or receiving data over a network 130, as described herein. In particular, tracking device 110 is generally configured to provide (e.g., broadcast) positional information of tracking device 110 to server 140, and server 140 is generally configured to receive and process (e.g., collect, categorize, and/or analyze) such positional information of tracking device 110 from tracking device 110 (e.g., over network 130). In some embodiments, positional information of tracking device 110 is received from tracking device 110 at a primary tracking system 122 (e.g., a server, database, or other structure for storing positional information of tracking device 110) and such positional information of tracking device 110 is received by server 140 from primary tracking system 112, although other embodiments are not necessarily so limited. In certain environments, such as when tracking device 110 buried in a shipyard amongst other shipping containers or onboard a sea vessel or aircraft, signal communication between tracking device 110 and server 140 may be difficult—and often impossible—to establish and/or maintain. In embodiments, as described herein, server 140 is generally configured to receive positional information of tracking device 110 during a first operational mode. By way of non-limiting example, as described herein, the first operational mode may be defined and/or limited to periods in which tracking device 110 is capable of establishing and/or maintaining signal communication with server 140. As will be appreciated by those skilled in the art, in addition to positional information, tracking device 110 may, in some embodiments, be further configured to provide (e.g., broadcast) a variety of other information (e.g., temperature, moisture, acceleration, direction).

As described herein, server 140 may be configured to determine whether tracking device 110 is in signal communication with server 140 and/or primary tracking system 122. For example, tracking device 110 may periodically attempt to establish a signal communication with server 140 and/or server 140 may periodically attempt to establish a signal communication with tracking device 110, such as by sending interrogation signals therebetween as known in the art. The interval between such signal communications attempts may be varied, as desired, to suit a particular application, such as to conserve battery power of tracking device 110. In certain embodiments, as described herein, server 140 may determine a position of transportation medium 104 (e.g., in real-time) based on the positional information received from secondary tracking device 106 and/or secondary tracking system 120 and, based thereon, determine whether it is likely for tracking device 110 to be capable of establishing and/or maintaining signal communication with server 140, which determination may influence whether to send one or more interrogation signals between tracking device 110 and server 140 and/or whether to switch between the first operational mode and the second operational mode, as described herein. In this regard, to conserve battery of tracking device 110, tracking device 110 may be configured to be in, or transition to, a "standby" state (e.g., low power state) in which tracking device 110 does not provide and/or broadcast positional information to server 140 and/or primary tracking system 122 (e.g., the satellite positioning component is not powered on). In certain embodiments, tracking device 110 may be in the "standby" state in the second operational mode, when tracking device 110 is not in signal communication with server 140 and/or primary tracking system 122, and/or after a predetermined number of unsuccessful attempts to establish signal communication between tracking device 110 and server 140 and/or primary tracking system 122.

Figure 1B:
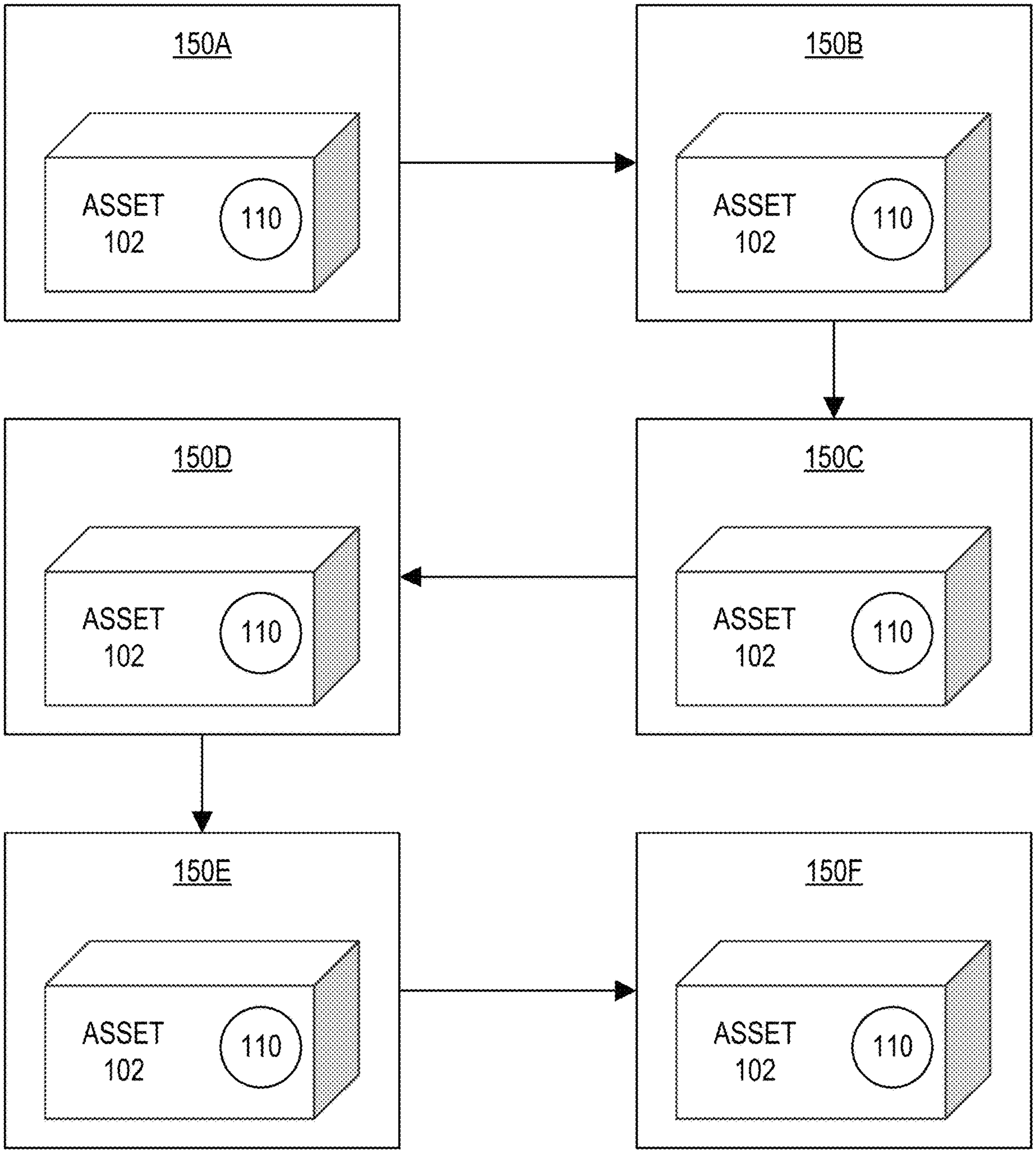
FIG. 1B shows a path traveled by an asset to which a tracking device is attached according to an illustrative embodiment of the present disclosure.

FIG. 1B illustrates a path traveled by asset 102 to which tracking device 110 is attached according to one embodiment. As will be appreciated by those skilled in the art, an asset may often travel from an origin to a destination through various environments along its route. For example, as illustrated in FIG. 1B, asset 102 (e.g., an intermodal shipping container) may travel from a first environment 150A (e.g., an origin) to a final environment 150F (e.g., a destination) and may pass through various other environments 150B-150E along the route. In the non-limiting embodiment illustrated in FIG. 1B, the first environment 150A may be, for example, a factory and the final environment 150F may be, for example, a customer's warehouse. As illustrated, asset 102 may travel from the first environment, such as a factory, to a second environment 150B, such as a departure port or shipyard; from the departure port or shipyard to a third environment 150C, such as a first transportation medium (e.g., transportation medium 104, a sea vessel); from the first transportation medium to a fourth environment 150D, such as an arrival port or shipyard; from the arrival port or shipyard to a fifth environment 150E, such as a second transportation medium (e.g., vehicle, railcar); and from the second transportation medium to the final environment 150F, such as a customer's warehouse. As will be appreciated by those skilled in the art, the systems and methods described herein are not limited to use with the specific path of travel of asset 102 illustrated in FIG. 1B and can instead be used with any suitable path of travel.

As described herein, one or more of the environments 150A-150F may have a respective geofence associated therewith, including for movable environments (e.g., one or more transportation mediums) a motion geofence. As a result, the position of asset 102 may be tracked and, more particularly, an appropriate operational mode may be determined based upon such geofences, as described herein.

As will be further appreciated by those skilled in the art, one or more of the environments 150A-150F may have a respective tracking device, particularly if such environment is a mobile environment. By way of non-limiting example, as described above, the third environment 150C may be or include a first transportation medium (e.g., transportation medium 104, a sea vessel) and/or the fifth environment 150E may be or include a second transportation medium (e.g., vehicle, railcar), and the first transportation medium 104 may have a respective tracking device 106 for providing positional information of first transportation medium 104 to secondary tracking system 120 and/or server 140, and the second transportation medium (not shown) may have a respective tracking device (not shown) for providing positional information of the second transportation medium to yet another tracking system and/or server 140. In this way, server 140 is generally configured to receive both (i) positional information of tracking device 110 from tracking device 110 and/or a tracking system associated therewith, as available, and (ii) positional information of transportation medium(s) for carrying the asset to which tracking device 110 is attached from such transportation medium(s) and/or tracking system(s) associated therewith, as available, and is further configured to selectively and intelligently switch between various operational modes in order to track the asset and/or the transportation medium(s) in real-time.

Figure 2:
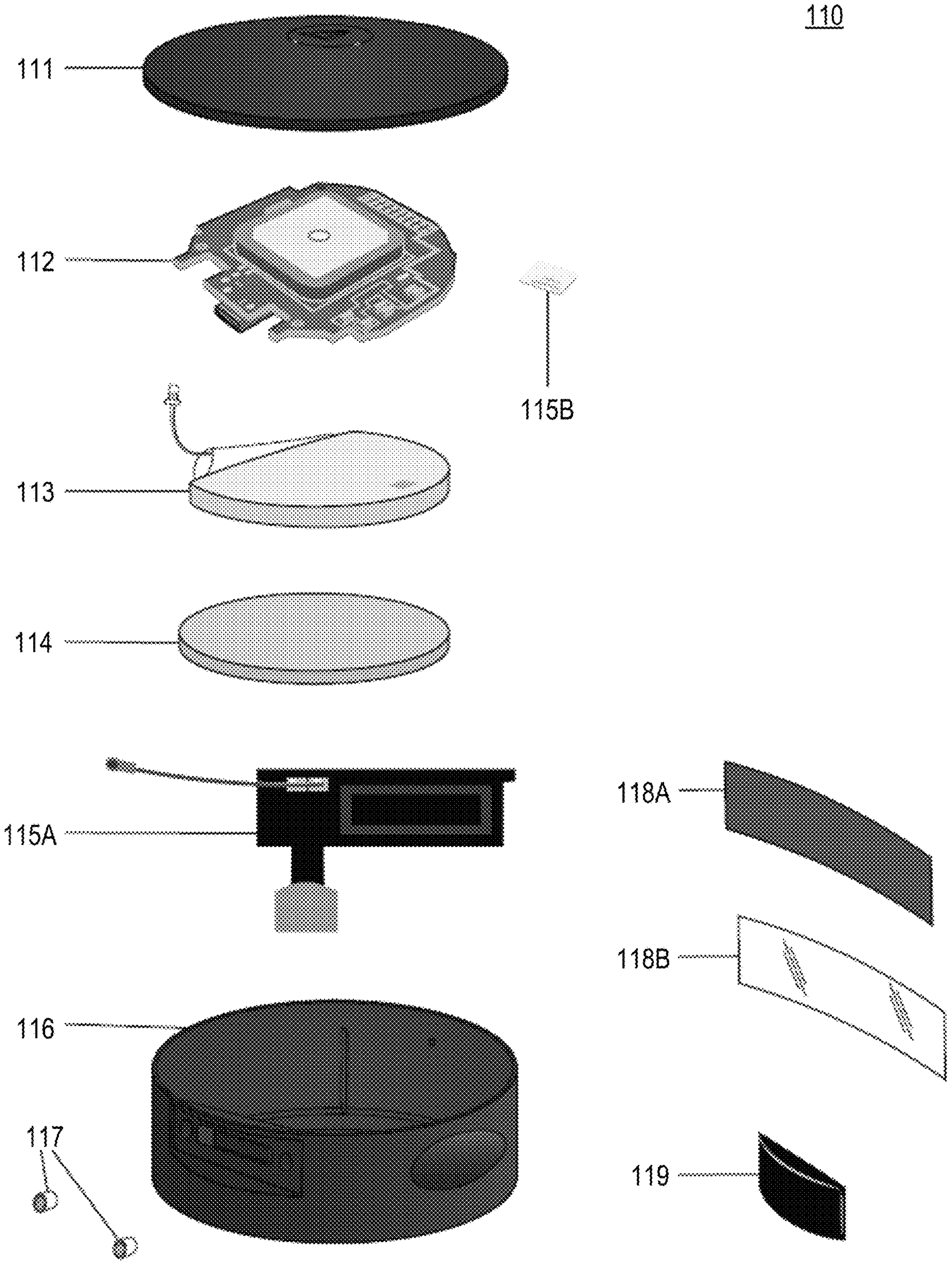
FIG. 2 shows a tracking device according to an illustrative embodiment of the present disclosure.

FIG. 2 illustrates an example tracking device 110 usable in system 100 according to one embodiment. In the non-limiting embodiment illustrated in FIG. 2, tracking device 110 shares many common design aspects with a 54 GPS tracker or other similar tracking device commercially available from LandAirSea, Inc. of Woodstock, Illinois. For example, tracking device 110 may include a cover 111, a control board 112, a battery 113, a magnet 114, an antenna 115A, a subscriber identity module (SIM) card 115B, a housing 116, brass inserts 117, a gasket strip 118A, a clear strip 18B, and a rubber cap 119. As will be appreciated by those skilled in the art, tracking device 110 is designed to operate in a self-contained manner. Battery 113 is configured to internally provide power to tracking device 110, including the components thereof. Antenna 115A is configured to effectuate signal communication to and/or from tracking device 110, such as via a cellular communications protocol (e.g., Fifth Generation of Mobile Communications (5G), Long Term Evolution (LTE), Enhanced Data rates for GSM Evolution (EDGE), Global System for Mobile Communications (GSM), or the like). Tracking device 110 may include a positional component configured to transmit and/or receive positional information, such as a satellite positioning system transceiver (e.g., GPS transceiver). Tracking device 110 may further include various other components or modules commonly employed in tracking devices, such an accelerometer. As will be appreciated by those skilled in the art, the systems and methods described herein are not limited to use with the specific tracking device 110 illustrated in FIG. 2 and can instead be used with any suitable tracking device, including an off-the-shelf tracking device.

With reference again to FIG. 1, as described herein, server 140 may also be in may be in signal communication with (e.g., communicatively coupled with) a secondary tracking device 106 (e.g., via an API), such as for sending and/or receiving data over network 132, as described herein. Although network 130 and network 132 are illustrated as separate networks, those skilled in the art will appreciate that network 130 and network 132 could be implemented as a single network, as desired to suit a particular application. As illustrated, secondary tracking device 106 is generally independent of tracking device 110. By way of non-limiting example, tracking device 110 is associated with (e.g., attached to) asset 102, as described herein, whereas secondary tracking device 106 is associated with (e.g., attached to) transportation medium 104, such that tracking device 110 generally travels with asset 102 and secondary tracking device 106 generally travels with transportation medium 104. Similar to tracking device 110, secondary tracking device 106 is generally configured to provide (e.g., broadcast) positional information of transportation medium 104 carrying asset 102 to server 140, and server 140 is generally configured to receive and process (e.g., collect, categorize, and/or analyze) such positional information of transportation medium 104 from secondary tracking device 10 (e.g., over network 132)6. In some embodiments, positional information of transportation medium 104 is received from secondary tracking device 106 at a secondary tracking system 120 (e.g., a server, database, or other structure for storing positional information of transportation medium 104) and such positional information of transportation medium 104 is received by server 140 from secondary tracking system 120, although other embodiments are not necessarily so limited. Secondary tracking system 120 may be any suitable system that provides and/or maintains positional information associated with the transportation medium 104 carrying the asset 102 to be tracked. By way of non-limiting example, in embodiments in which transportation medium 104 is a sea vessel carrying (e.g., carrying an intermodal shipping container or other asset to be tracked), secondary tracking system 120 may be an automatic identification (AIS) system that provides and/or maintains positional information associated with such sea vessel (e.g., the Kpler tracking system commercially available via www-.martinetraffic.com from Kpler Holding SA of Brussels, Belgium), which may be received by server 140 (e.g., via an API). By way of further non-limiting example, in embodiments in which transportation medium 104 is an aircraft (e.g., carrying an intermodal shipping container or other asset to be tracked), secondary tracking system 120 may be an automated dependent surveillance-broadcast (ADS-B) system that provides and/or maintains positional information associated with such aircraft (e.g., the Flightradar24 tracking system commercially available via www.flightradar24.com from Flightradar24 AB of Stockhold, Sweden), which may be received by server 140 (e.g., via an API).

As will be appreciated by those skilled in the art, asset 102 may be any suitable asset for which it is desirable to track the position thereof, and the systems and methods of the present disclosure are not limited to any particular asset. By way of non-limiting example, the assets to be tracked may include intermodal shipping containers, generators, firearms, or the like, including combinations thereof. As will be appreciated by those skilled in the art, transportation medium 104 may be any suitable medium for carrying asset 102, and the systems and methods of the present disclosure are not limited to any particular transportation medium. By way of non-limiting example, the transportation medium may include sea vessels, aircraft, trailers, or the like, including combinations thereof. As will be appreciated by those skilled in the art, network 130 may be any suitable network, and the systems and methods of the present disclosure are not limited to any particular network. By way of non-limiting example, network 130 may be a public network (e.g., the Internet) or a private network (e.g., a local area network (LAN) or a virtual private network (VPN)).

As described herein, in the first operational mode, server 140 is configured to receive at least the positional information of tracking device 110 from tracking device 110. Conversely, in the second operational mode, server 140 is configured to receive at least the positional information of transportation medium 104 from secondary tracking system 120. In certain embodiments, server 140 may be configured to operate in the first operational mode and the second operational mode simultaneously, such that the server 140 simultaneously receives the positional information of tracking device 110 and the position information of transportation medium 104, such as for determining that a particular asset 102 (and tracking device 110 attached thereto) is being carried by a particular transportation medium 104. In alternative embodiments, server 140 may be configured to operate such that, in the first operational mode and/or in the second operational mode, server 140 is configured to receive both the positional information of tracking device 110 from tracking device 110 and the positional information of transportation medium 104 from secondary tracking system 120. In certain embodiments, the first operational mode may be preferred or otherwise have priority of the second operational mode, such that server 140 is configured to receive the positional information of tracking device 110 so long as tracking device 110 is in signal communication with server 140. For example, if tracking device 110 is in signal communication with server 140 (e.g., when asset 102 to which tracking device 110 is attached is in a port or shipyard or other environment in which signal communication between is tracking device 110 and server 140 is available and established), server 140 does not necessarily need to receive any tracking information from secondary tracking system 120 or any positional information associated with any transportation mediums 104. Put another way, asset 102 and tracking device 110 attached thereto do not need (and preferably will not) to be linked or associated with transportation medium 104 when transportation medium 104 is not carrying asset 102 and tracking device 110 attached thereto. In this way, when tracking device 110 is in signal communication with server 140, asset 102 to which tracking device 110 is attached may be tracked in real-time, such that the instantaneous location of asset 102 may be known in real-time, as desired.

In embodiments, server 140 may incorporate or otherwise communicate with a user interface accessible by a user interested in tracking an asset, such as via user device 160. For example, user device 160 may provide the user interface, which may include a display of asset 102, transportation medium 104, and/or tracking device 110, such as overlaid on a map, thereby allowing the user to track asset 102 in real-time, as desired. In the same or other embodiments, server 140 may be configured to generate reports and/or alerts, such as user-defined reports and/or alerts, related to tracking of asset 102, and such alerts may be viewable by the user via user device 160. By way of non-limiting example, as described herein, server 140 may be configured to alert the user when it is determined that tracking device 110 is or is not being carried via transportation medium 104, when it is determined that tracking device 110 is or is not within a motion geofence associated with transportation medium 104, when it is determined that tracking device 110 is or is not in signal communication with server 140, and the like, including combinations thereof. User device 160 may generally be of any suitable type as desired to suit a particular application. By way of non-limiting example, user device 160 may be a mobile phone, a computer, a tablet, or the like.

System 100 is configured to (e.g., system 100 comprises a non-transitory computer-readable medium storing instructions executable by a processor to) receive positional information of the tracking device therefrom during at least the first operational mode, receive positional information of the transportation medium from the secondary tracking system associated therewith during at least the second operational mode, determine whether the tracking device is being carried via the transportation medium, and automatically switch between the first operational mode and the second operational mode in response to determining whether the tracking device is being carried via the transportation medium, as described herein. In embodiments, system 100 may be configured to operate in the first operational mode (and receive positional information of the tracking device therefrom) for as long as possible (e.g., as long as signal communication is established between server 140 and tracking device 110) to support determining whether a particular asset 102 (and tracking device 110 attached thereto) is being carried by a particular transportation medium 104 and switch to the second operational mode (receive positional information of the transportation medium from the secondary tracking system associated therewith) only when positional information of the tracking device is not available or otherwise not being received (e.g., when tracking device 110 is not in signal communication with server 140). As illustrated in FIG. 1, system 100 may generally include a variety of components for effectuating the functionality described herein.

System 100 and the functionality described in connection therewith may be particularly suitable for use in an environment in which signal communication between tracking device 110 and server 140 is difficult or impossible to consistently maintain, such as when tracking device 110 is attached to a shipping container that is buried in a shipyard amongst other shipping containers or onboard a sea vessel or aircraft. In such instances, the systems and methods described herein may be utilized for tracking the shipping container by selectively and intelligently switching between various operational modes to leverage various different available connectivity or tracking/positioning systems based upon specific determinations, such as whether the tracking device is being carried via the transportation medium, whether the tracking device is within a motion geofence associated with the transport medium, whether the tracking device is in signal communication with a server, or the like, including combinations thereof, as described herein.

As described herein and as will be appreciated by those skilled in the art, the functionality for selectively and intelligently switching between various operational modes to leverage various different available connectivity or tracking/positioning systems based upon specific determinations, such as whether the tracking device is being carried via the transportation medium, whether the tracking device is within a motion geofence associated with the transport medium, whether the tracking device is in signal communication with a server, or the like, including combinations thereof, may be implemented in and/or by server 140.

Figure 3:
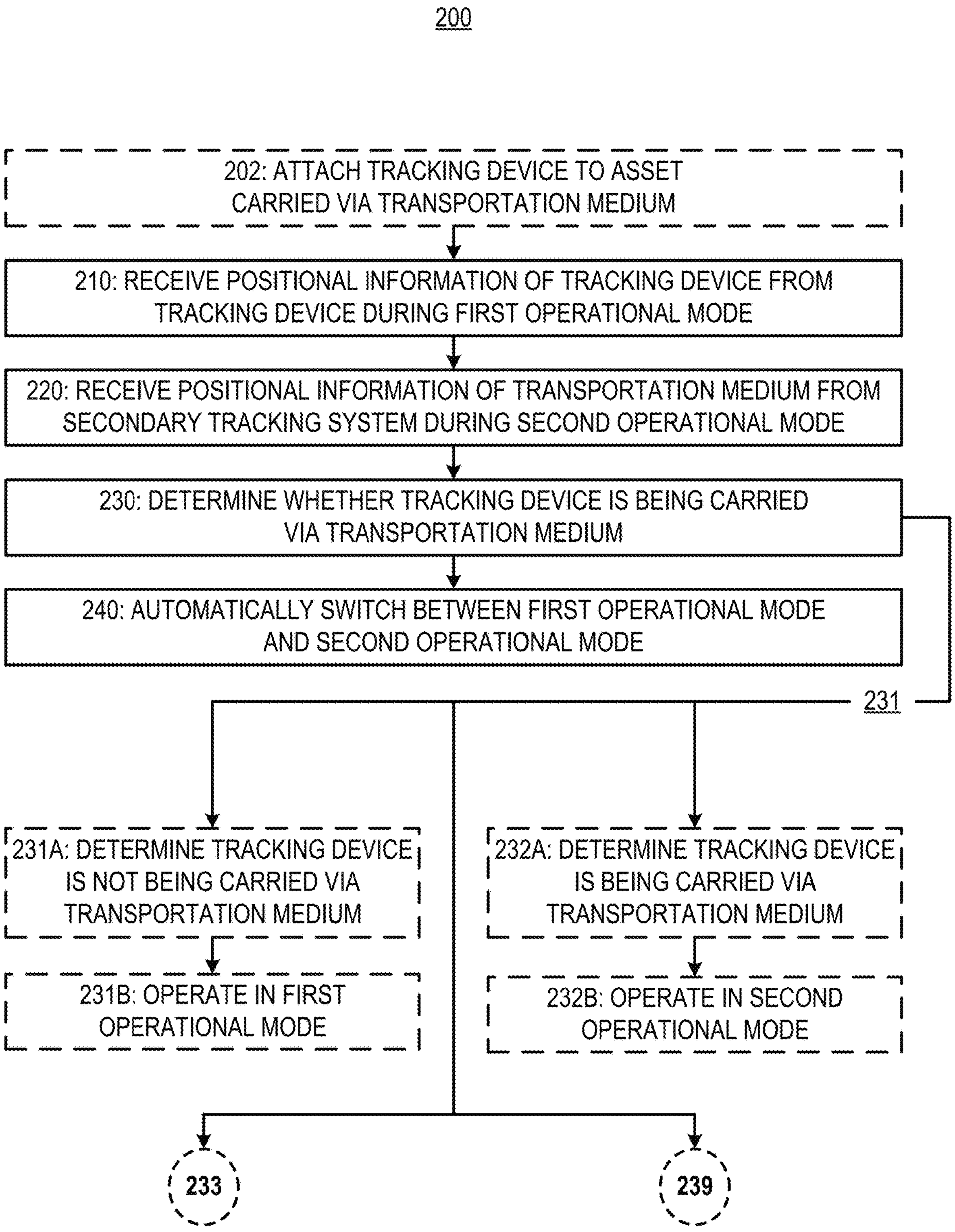
FIG. 3 shows a method for tracking an asset carried via a transportation medium according to an illustrative embodiment of the present disclosure.
Figure 3A:
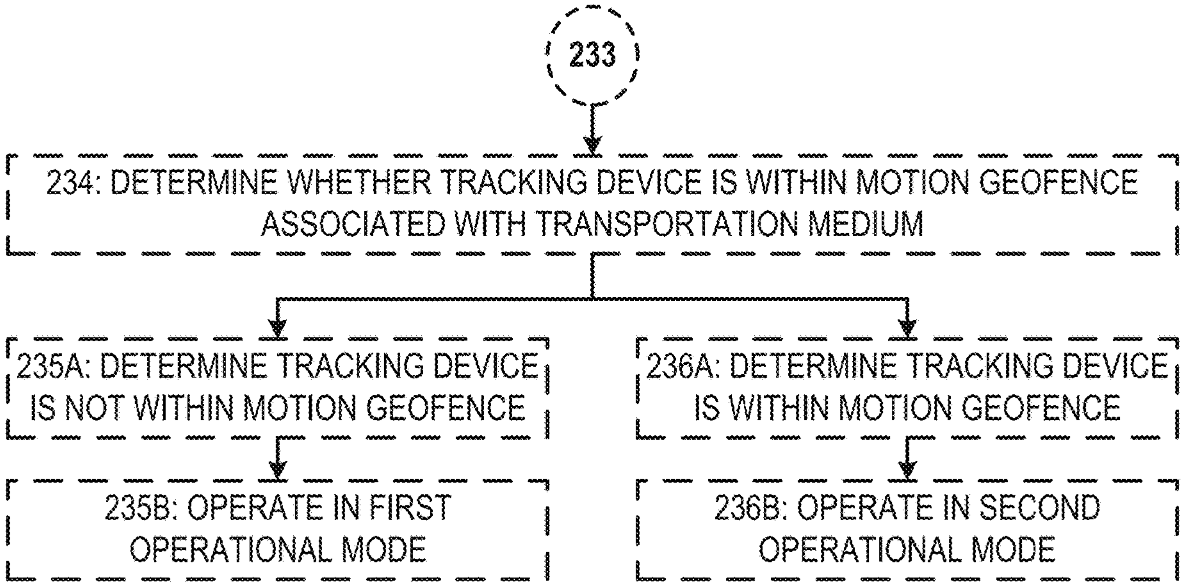
FIG. 3A shows a sub-process of the method of FIG. 3 according to an illustrative embodiment of the present disclosure.
Figure 3B:
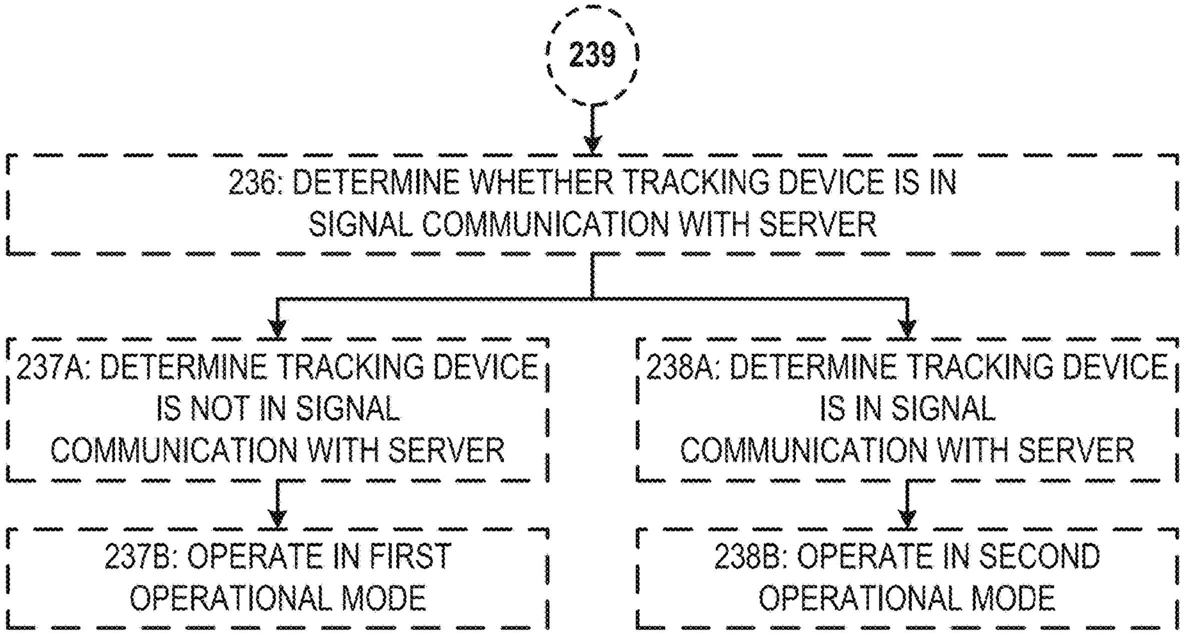
FIG. 3B shows another sub-process of the method of FIG. 3 according to an illustrative embodiment of the present disclosure.

FIG. 3 illustrates an example methodology 200 for tracking an asset carried via a transportation medium according to one embodiment. Methodology 200 can be implemented using instructions stored on a non-transitory computer-readable medium that can be executed by a processor. Methodology 200 is described herein with specific reference to tracking device 110 and server 140 illustrated in FIG. 1, although it will understood that methodology could be employed with other devices.

Methodology 200 may start at step 202 where a tracking device (e.g., tracking device 110) to an asset (e.g., asset 102) carried via a transportation medium (e.g., transportation medium 104), such as magnetically.

At step 210, positional information of the tracking device is received from the tracking device during at least a first operational mode. The positional information of the tracking device (e.g., tracking device 110) may be received from the tracking device by a server (e.g., server 140), as described herein. In embodiments, the positional information of the tracking device may include or be received with metadata associated therewith, such as a timestamp, data indicative of the particular tracking device, or the like, including combinations thereof. In some embodiments, the positional information of the tracking device may be received periodically, including at predetermined intervals, during at least the first operational mode. In other embodiments, the positional information of the tracking device may be received continuously during at least the first operational mode.

At step 220, positional information of the transportation medium is received from a secondary tracking system during at least a second operational mode. The positional information of the transportation medium (e.g., transportation medium 104) may be received from the secondary tracking system (e.g., secondary tracking system 220) by the server (e.g., server 140), as described herein. In embodiments, the positional information of the transportation medium may include or be received with metadata associated therewith, such as a timestamp, data indicative of the particular transportation medium and/or secondary tracking system, or the like, including combinations thereof. In some embodiments, the positional information of the transportation medium may be received periodically, including at predetermined intervals, during at least the second operational mode. In other embodiments, the positional information of the transportation medium may be received continuously during at least the second operational mode.

At step 230, it is determined whether the tracking device is being carried via the transportation medium. Determining whether the tracking device is being carried via the transportation medium may be performed in various different ways, as described herein.

At step 240, in response to determining whether the tracking device is being carried via the transportation medium (at step 230), switching between the first operational mode and the second operational mode is performed automatically, as described herein.

A first sub-methodology 231 is also illustrated in FIG. 3 according to one embodiment. In sub-methodology 231, at step 231A, it may be determined that the tracking device is not being carried via the transportation medium. For example, the asset to which the tracking device is attached may have not yet been loaded upon or may have been unloaded from the transportation medium. At step 231B, in response to determining that the tracking device is not being carried via the transportation medium (at step 231A), the server may operate in the first operational mode. For example, if the server is already operating in the first operational mode (and receiving the positional information of the tracking device from the tracking device), in response to determining that the tracking device is not being carried via the transportation medium at step 231A, the server may continue operating in the first operational mode and continue receiving the positional information of the tracking device from the tracking device at step 231B. Conversely, if the server is operating in the second operational mode (and receiving the positional information of the transportation medium from the secondary tracking system), in response to determining that the tracking device is not being carried via the transportation medium at step 231A, the server may automatically switch to the first operational mode and begin receiving the positional information of the tracking device from the tracking device at step 231B. On the other hand, in sub-methodology 231, at step 232A, it may be determined that the tracking device is being carried via the transportation medium. For example, the asset to which the tracking device is attached may be currently loaded upon the transportation medium. At step 232B, in response to determining that the tracking device is being carried via the transportation medium (at step 232A), the server may operate in the second operational mode. For example, if the server is already operating in the second operational mode (and receiving the positional information of the transportation medium from the secondary tracking system), in response to determining that the tracking device is being carried via the transportation medium at step 232A, the server may continue operating in the second operational mode and continue receiving the positional information of the transportation medium from the secondary tracking system. Conversely, if the server is operating in the first operational mode (and receiving the positional information of the tracking device from the tracking device), in response to determining that the tracking device is being carried via the transportation medium at step 232A, the server may automatically switch to the second operational mode and begin receiving the positional information of the transportation medium from the secondary tracking system at step 232B. Selectively and intelligently switching between the first operational mode and the second operational mode in response to determining whether the tracking device is being carried via the transportation medium may, in embodiments, advantageously automatically switch to the operational mode that will provide the most relevant and/or real-time positional information and may further conserve the battery of the tracking device. For example, if it is determined that the tracking device is not being carried via the transportation medium, receiving positional information of the transportation medium may be of limited value and/or relevance for tracking the asset to which the tracking device is attached. Conversely, if it is determined that the tracking device is being carried via the transportation medium, and particularly in situations in which it may be difficult or impossible to establish a signal communication between the tracking device and the server or otherwise receive positional information of the tracking device from the tracking device, receiving positional information of the transportation medium may be of increased value and/or relevance for tracking the asset to which the tracking device is attached.

A second sub-methodology 233 is illustrated in FIG. 4 according to one embodiment. In sub-methodology 233, at step 234, it may be determined whether the tracking device is within a motion geofence associated with the transportation medium, such as for determining whether a particular asset (and the tracking device attached thereto) is being carried by a particular transportation medium. For example, in embodiments, server 140 may be configured to determine whether the tracking device is within (e.g., has entered or remained within) or outside of (e.g., has not entered or has strayed from) a predetermined virtual positional boundary (the so-called geofence) associated with the transportation medium. In embodiments, a motion geofence may be defined for the transportation medium (e.g., by a user via user device 160) and may, for example, be defined by predetermined positional boundaries around or otherwise associated with a mobile position of the transportation medium, such that the geofence travels along with the transportation medium as the transportation medium travels. This is distinguished from a non-motion geofence in which a predetermined area is defined around a static location or the like. As will be appreciated by those skilled in the art, a corresponding motion geofence may be defined for each respective transportation medium and/or for each respective environment through which the asset to which the tracking is attached may travel (e.g., by a user via user device 160). By way of non-limiting example, with reference again to FIG. 1B, server 140 may be configured to determine whether asset 102 (and tracking device 110 attached thereto) is at a factory 150A, a departure port or shipyard 150B, an arrival port or shipyard 150D, or a customer's warehouse 150F (e.g., by employing geofences associated with such environments, as described herein) or is being carried by a transportation medium 150C, 150E (e.g., by employing motion geofences associated with such transportation mediums, as described herein). For example, as described herein, in response to determining that asset 102 (and tracking device 110 attached thereto) is being carried by a particular transportation medium (e.g., transportation medium 104), server 140 may relate asset 102 and/or tracking device 110 with such transportation medium and receive positional information of such transportation medium in order to track asset 102, particularly at the point that server 140 loses signal communication with tracking device 110. As will be further appreciated by those skilled in the art, the motion geofence may move as the transportation medium moves, such that the motion geofence represents a boundary associated with the transportation medium in real-time. By way of non-limiting example, the motion geofence may define the outermost boundaries of the transportation medium and/or the outermost boundary of a carrying portion of the transportation medium, although other embodiments are not necessarily so limited. In embodiments, a motion geofence associated with the transportation may be maintained and/or provided by the secondary tracking system and may be accessible by the server (e.g., via an API). In other embodiments, the motion geofence associated with the transportation may be maintained and/or provided directly by the server.

Continuing with sub-methodology 233, at step 235A, it may be determined that the tracking device is not within the motion geofence associated with the transportation medium. For example, the asset to which the tracking device is attached may have not yet been loaded upon or may have been unloaded from the transportation medium, thereby being positioned outside of the motion geofence associated with the transportation medium. At step 235B, in response to determining that the tracking device is not within the motion geofence associated with the transportation medium (at step 235A), the server may operate in the first operational mode. For example, if the server is already operating in the first operational mode (and receiving the positional information of the tracking device from the tracking device), in response to determining that the tracking device is not within the motion geofence associated with the transportation medium at step 235A, the server may continue operating in the first operational mode and continue receiving the positional information of the tracking device from the tracking device at step 235B. Conversely, if the server is operating in the second operational mode (and receiving the positional information of the transportation medium from the secondary tracking system), in response to determining that the tracking device is not within the motion geofence associated with the transportation medium at step 235A, the server may automatically switch to the first operational mode and begin receiving the positional information of the tracking device from the tracking device at step 235B. On the other hand, in sub-methodology 233, at step 236A, it may be determined that the tracking device is within the motion geofence associated with the transportation medium. For example, the asset to which the tracking device is attached may be currently loaded upon the transportation medium, thereby being positioned within the motion geofence associated with the transportation medium. At step 236B, in response to determining that the tracking device is within the motion geofence associated with the transportation medium (at step 236A), the server may operate in the second operational mode. For example, if the server is already operating in the second operational mode (and receiving the positional information of the transportation medium from the secondary tracking system), in response to determining that the tracking device is within the motion geofence associated with the transportation medium at step 236A, the server may continue operating in the second operational mode and continue receiving the positional information of the transportation medium from the secondary tracking system. Conversely, if the server is operating in the first operational mode (and receiving the positional information of the tracking device from the tracking device), in response to determining that the tracking device is within the motion geofence associated with the transportation medium at step 236A, the server may automatically switch to the second operational mode and begin receiving the positional information of the transportation medium from the secondary tracking system at step 236B. Selectively and intelligently switching between the first operational mode and the second operational mode in response to determining whether the tracking device is within the motion geofence associated with the transport medium may, in embodiments, advantageously automatically switch to the operational mode that will provide the most relevant and/or real-time positional information and may further conserve the battery of the tracking device. For example, if it is determined that the tracking device is not within the motion geofence associated with the transportation medium, receiving positional information of the transportation medium may be of limited value and/or relevance for tracking the asset to which the tracking device is attached. Conversely, if it is determined that the tracking device is within the motion geofence associated with the transportation medium, and particularly in situations in which it may be difficult or impossible to establish a signal communication between the tracking device and the server or otherwise receive positional information of the tracking device from the tracking device, receiving positional information of the transportation medium may be of increased value and/or relevance for tracking the asset to which the tracking device is attached.

As will be appreciated by those skilled in the art, a geofence can be associated with any of the environments within which asset 102 may be positioned along its route, such as environments 150A-150F illustrated in FIG. 1B. By way of non-limiting example, a geofence may be defined in association with an origin environment (e.g., a factory). In this way, as server 140 receives positional information of tracking device 110 therefrom, server 140 can determine whether tracking device 110 is within the geofence associated with the factory. This methodology may be similarly extended to any other environment, such as a shipyard, a customer's warehouse, or the like. Relatedly, as described herein, a motion geofence can be associated with any of the mobile environments designed to carry asset 102, such as transportation mediums (e.g., transportation medium 104, a sea vessel, a railcar, a vehicle). In this way, as server 140 receives positional information of tracking device 110 therefrom, server 140 can determine whether tracking device 110 is within the motion geofence associated with the transportation medium. By way of non-limiting example, server 140 may determine that tracking device 110 has entered a motion geofence associated with a particular transportation medium 104 and may therefore determine or understand that tracking device 110 is being carried by such transportation medium 104 (e.g., by being attached to an asset 102 that was loaded on to such transportation medium 104). Advantageously, server 140 may thereafter operate in the second operational mode and receive positional information associated with such transportation medium 104, which positional information will necessarily also be indicative of the position of tracking device 110 since tracking device 110 is being carried via such transportation medium 104. Further, server 140 may receive additional positional information of tracking device 110 therefrom (e.g., periodically) and may subsequently determine that tracking device 110 has exited the motion geofence associated with the transportation medium 104 and may therefore determine or understand that tracking device 110 is no longer being carried by such transportation medium 104 (e.g., by being attached to an asset 102 that was off-loaded from such transportation medium 104). Advantageously, server 140 may thereafter operate in the first operational mode and receive positional information associated with tracking device 110, such that asset 102 can continue to be tracked accurately and in real-time. Server 140 may be configured to selectively and intelligently switch between various operational modes and receive positional information from various sources in response to determinations with respect to any number of available geofences within which tracking device 110 may enter or exit.

A third sub-methodology 239 is also illustrated in FIG. 4 according to one embodiment. In sub-methodology 239, at step 236, it may be determined whether the tracking device is in signal communication with the server (e.g., whether the tracking device is capable of transmitting positional information of the tracking device to the server). In embodiments, the tracking device may periodically attempt to establish a signal communication with the server and/or the server may periodically attempt to establish a signal communication with the tracking device, such as by sending interrogation signals therebetween as known in the art.

Continuing with sub-methodology 239, at step 237A, it may be determined that the tracking device is not in signal communication with the server. For example, the tracking device may be in an environment in which it is difficult or impossible to establish a reliable connection to the server (e.g., when the asset is buried in a shipyard amongst other shipping containers or onboard a sea vessel or aircraft). At step 237B, in response to determining that the tracking device is not in signal communication with the server (at step 237A), the server may operate in the first operational mode. For example, if the server is already operating in the first operational mode (and receiving the positional information of the tracking device from the tracking device), in response to determining that the tracking device is not in signal communication with the server at step 237A, the server may continue operating in the first operational mode and continue receiving the positional information of the tracking device from the tracking device at step 237B. Conversely, if the server is operating in the second operational mode (and receiving the positional information of the transportation medium from the secondary tracking system), in response to determining that the tracking device is not in signal communication with the server at step 237A, the server may automatically switch to the first operational mode and begin receiving the positional information of the tracking device from the tracking device at step 237B. On the other hand, in sub-methodology 239, at step 238A, it may be determined that the tracking device is in signal communication with the server. For example, the tracking device may be capable of transmitting positional information of the tracking device to the server. At step 238B, in response to determining that the tracking device is in signal communication with the server (at step 238A), the server may operate in the second operational mode. For example, if the server is already operating in the second operational mode (and receiving the positional information of the transportation medium from the secondary tracking system), in response to determining that the tracking device is in signal communication with the server at step 238A, the server may continue operating in the second operational mode and continue receiving the positional information of the transportation medium from the secondary tracking system. Conversely, if the server is operating in the first operational mode (and receiving the positional information of the tracking device from the tracking device), in response to determining that the tracking device is in signal communication with the server at step 238A, the server may automatically switch to the second operational mode and begin receiving the positional information of the transportation medium from the secondary tracking system at step 238B. Selectively and intelligently switching between the first operational mode and the second operational mode in response to determining whether the tracking device is in signal communication with the server may, in embodiments, advantageously automatically switch to the operational mode that will provide the most relevant and/or real-time positional information and may further conserve the battery of the tracking device. For example, if it is determined that the tracking device is not in signal communication with the server, receiving positional information of the tracking device from the tracking device will generally be impossible, and repeated or successive attempts to establish (or reestablish) such signal communication within a particular timeframe may unnecessarily consume valuable battery of the tracking device. Conversely, if it is determined that the tracking device is in signal communication with the server, receiving positional information of the tracking device from the tracking device may be of increased value and/or relevance for tracking the asset to which the tracking device is attached because receiving the positional information of the tracking device from the tracking device may, in embodiments, provide the most accurate and/or real-time positional information for tracking the asset.

As will be appreciated by those skilled in the art, one or more of the first sub-methodology 231, the second sub-methodology 233, and the third sub-methodology 239 may be performed as part of methodology 200. In certain embodiments, the first sub-methodology 231, the second sub-methodology 233, and the third sub-methodology 239 may be employed as alternatives to one another. In other embodiments, the first sub-methodology 231, the second sub-methodology 233, and the third sub-methodology 239 may be employed as complements to one another. For example, methodology 200 may include one of, two of, or all three of first sub-methodology 231, second sub-methodology 233, and third sub-methodology 239.

Although the foregoing has focused primarily on the use of a motion geofence for determining whether a tracking device is being carried via a transportation medium (and, in particular, for selectively and intelligently switching between various operational modes to leverage various different available connectivity or tracking/positioning systems based upon such determination), as described herein and as will be appreciated by those skilled in the art, other information, determinations, or the like may also be employed as one or more bases for automatically switching between such operational modes.

Various aspects disclosed herein are to be taken in the illustrative and explanatory sense and should in no way be construed as limiting of the present disclosure. All numerical terms, such as, but not limited to, "first" and "second" or any other ordinary or numerical terms, should also be taken only as identifiers, to assist the reader's understanding of the various aspects, variations, components, or modifications of the present disclosure, and may not generate any limitations, particularly as to the order, or preference, of any aspect, variation, component or modification relative to, or over, another aspect, variation, component or modification.

It is to be understood that individual features shown or described for one aspect may be combined with individual features shown or described for another aspect. The above-described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

The present disclosure is described herein with reference to system architecture, block diagrams, flowchart illustrations of methods, and computer program products according to various aspects of the disclosure. It will be understood that each functional block of the block diagrams and the flowchart illustrations, and combinations of functional blocks in the block diagrams and flowchart illustrations, respectively, can be implemented by computer program instructions.

These software elements may be loaded onto a general-purpose computer, special purpose computer, or other programmable data-processing apparatus to produce a machine, such that the instructions that execute on the computer or other programmable data-processing apparatus generate means for implementing the functions specified in the flowchart block or blocks. These computer program instructions may also be stored in a computer-readable memory that can direct a computer or other programmable data-processing apparatus to function in a particular manner, such that the instructions stored in the computer-readable memory produce an article of manufacture including instruction means that implement the function specified in the flowchart block or blocks. The computer program instructions may also be loaded onto a computer or other programmable data-processing apparatus to cause a series of operational steps to be performed on the computer or other programmable apparatus to produce a computer-implemented process, such that the instructions that execute on the computer or other programmable apparatus provide steps for implementing the functions specified in the flowchart block or blocks. In an aspect, the computer program instructions may be executed on any remote-hosted application framework, for example, by a processor associated with a cloud server.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, websites, web forms, prompts, etc. Practitioners will appreciate that the illustrated steps described herein may comprise in any number of configurations including the use of windows, web pages, hypertexts, hyperlinks, web forms, popup windows, prompts, and the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

The systems, methods and computer program products disclosed in conjunction with various aspects of the present disclosure are embodied in systems and methods for facilitating multiple types of communications via a network based portal. While aspects of the present disclosure have been particularly shown and described with reference to the examples above, it will be understood by those skilled in the art that various combinations of the disclosed aspects or additional aspects may be contemplated by the modification of the disclosed machines, systems and methods without departing from the spirit and scope of what is disclosed. Such aspects should be understood to fall within the scope of the present disclosure as determined based upon the claims and any equivalents thereof.

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the invention. Accordingly, the above description should not be taken as limiting the scope of the invention.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the method and system, which, as a matter of language, might be said to fall therebetween.

What is claimed is:

1. A system for tracking an asset carried via a transportation medium, the system comprising:

a tracking device configured to be attached to the asset; and a server configured to:

receive, from the tracking device, positional information of the tracking device during at least a first operational mode;

receive, from a secondary tracking system associated with the transportation medium, positional information of the transportation medium during at least a second operational mode;

determine whether the tracking device is within a motion geofence associated with the transportation medium, wherein the motion geofence associated with the transportation medium is defined by a predetermined virtual positional boundary of the transportation medium such that the motion geofence associated with the transportation medium travels in real-time along with the transportation medium as the transportation medium travels; and automatically switch between the first operational mode and the second operational mode in response to determining whether the tracking device is within the motion geofence associated with the transportation medium by (a) operating in the first operational mode upon determining that the tracking device is not within the motion geofence associated with the transportation medium and (b) operating in the second operational mode upon determining that the tracking device is within the motion geofence associated with the transportation medium.

2. The system of claim 1, wherein the asset is a shipping container.

3. The system of claim 2, wherein:

the transportation medium is a sea vessel; and the secondary tracking system is an automatic identification system (AIS).

4. The system of claim 2, wherein:

the transportation medium is an aircraft; and the secondary tracking system is an automatic dependent surveillance-broadcast (ADS-B) system.

5. The system of claim 1, wherein, during at least a portion of the second operational mode, the tracking device is configured to be in a standby state in which the tracking device does not provide the positional information of the tracking device to the server.

6. The system of claim 1, further comprising a user device in signal communication with the server.

7. The system of claim 6, wherein the user device is configured to:

provide a user interface displaying each of the asset, the transportation medium, and the tracking device overlaid on a map.

8. The system of claim 6, wherein the server is further configured to:

send an alert to the user device upon determining that the tracking device is not within the motion geofence associated with the transportation medium.

9. The system of claim 1, wherein the motion geofence defines an outermost boundary of the transportation medium.

10. The system of claim 1, wherein the motion geofence defines an outermost boundary of a carrying portion of the transportation medium.

11. A method for tracking an asset carried via a transportation medium, the method comprising:

receiving, from a tracking device configured to be attached to the asset, positional information of the tracking device during at least a first operational mode;

receiving, from a secondary tracking system associated with the transportation medium, positional information of the transportation medium during at least a second operational mode;

determining whether the tracking device is within a motion geofence associated with the transportation medium, wherein the motion geofence associated with the transportation medium is defined by a predetermined virtual positional boundary of the transportation medium such that the motion geofence associated with the transportation medium travels in real-time along with the transportation medium as the transportation medium travels; and automatically switching between the first operational mode and the second operational mode in response to determining whether the tracking device is within the motion geofence associated with the transportation medium by (a) operating in the first operational mode upon determining that the tracking device is not within the motion geofence associated with the transportation medium and (b) operating in the second operational mode upon determining that the tracking device is within the motion geofence associated with the transportation medium.

12. The method of claim 11, wherein, during at least a portion of the second operational mode, the tracking device is configured to be in a standby state in which the tracking device does not provide the positional information of the tracking device to a server.

13. The method of claim 11, further comprising providing a user device in signal communication with a server.

14. The method of claim 13, further comprising:

providing, via the user device, a user interface displaying each of the asset, the transportation medium, and the tracking device overlaid on a map.

15. The method of claim 13, further comprising:

sending an alert to the user device upon determining that the tracking device is not within the motion geofence associated with the transportation medium.

16. A system for tracking an asset carried via a transportation medium, the system comprising a non-transitory computer-readable medium storing instructions executable by a processor to:

receive, from a tracking device configured to be attached to the asset, positional information of the tracking device during at least a first operational mode;

receive, from a secondary tracking system associated with the transportation medium, positional information of the transportation medium during at least a second operational mode;

determine whether the tracking device is within a motion geofence associated with the transportation medium, wherein the motion geofence associated with the transportation medium is defined by a predetermined virtual positional boundary of the transportation medium such that the motion geofence associated with the transportation medium travels in real-time along with the transportation medium as the transportation medium travels; and automatically switch between the first operational mode and the second operational mode in response to determining whether the tracking device is within the motion geofence associated with the transportation medium by (a) operating in the first operational mode upon determining that the tracking device is not within the motion geofence associated with the transportation medium and (b) operating in the second operational mode upon determining that the tracking device is within the motion geofence associated with the transportation medium.

17. The system of claim 16, wherein, during at least a portion of the second operational mode, the tracking device is configured to be in a standby state in which the tracking device does not provide the positional information of the tracking device to a server.

18. The system of claim 16, further comprising a user device in signal communication with a server.

19. The system of claim 18, wherein the user device is configured to:

provide a user interface displaying a map overlaid with the asset, the transportation medium, and the tracking device.

20. The system of claim 18, wherein the instructions are further executable by the processor to:

send an alert to the user device upon determining that the tracking device is not within the motion geofence associated with the transportation medium.

* * * * *